3,119,812
METHOD OF RECOVERING MICROBIAL POLYSACCHARIDES FROM THEIR FERMENTATION BROTHS

Seymour Peter Rogovin, Pekin, and William J. Albrecht, Peoria, Ill., assignors to the United States of America as represented by the Secretary of Agriculture
No Drawing. Filed Apr. 2, 1962, Ser. No. 184,607
4 Claims. (Cl. 260—209)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved method of recovering industrially useful microbial polysaccharides from fermentation broths comprising dilute solutions of the same.

More particularly this invention relates to a commercially advantageous method of recovering microbial polysaccharides such as that produced by *Xanthomonas campestris* NRRL B–1459 from solution in their fermentation broths in which they are produced in very low concentrations.

Microbial polysaccharides including the alkali-deacetylated derivative of the native polysaccharide produced in aerobic whole culture fermentations of *Xanthomonas campestris* NRRL B–1459 taught by Jeanes et al., U.S. Patent No. 3,000,790, are evoking commercial interest as thickening and suspending agents for foodstuffs, oil well recovery fluids, etc. However, the high cost of precipitating the native polysaccharides from their dilute fermentation broths with large amounts of methanol or ethanol hampers their competitive acceptance. Another recently prepared microbial polysaccharide meeting some commercial difficulty because of its isolation cost is phosphomannan, U.S. Patent No. 2,961,378 and the same may be expected for the novel microbial polysaccharides produced at this laboratory by the bacterium Arthrobacter NRRL B–1973 and *Crytococcus laurentii*, var. *flavescens* NRRL Y–1401.

Although it is known that quaternary amine compounds may precipitate certain dextrans from aqueous solutions, the failure to efficiently recover the expensive quaternary reagents has apparently discouraged the development of an economical process for isolating microbial polysaccharides from their fermentation broths. Also, any industrial attempts to employ quaternary amines as precipitating agents for microbial polysaccharides other than dextran would probably be greatly discouraged on finding, as we did, that the simple addition of a quaternary amine to the fully fermented viscous whole broth containing about 1.5 percent by dry weight of the polymer causes no observable change and certainly no procipitation of the polymer.

The principal object of our invention is the provision of a low cost process for isolating bacterial polysaccharides from their fermentation broths.

A more specific object is the provision of a method of forming and insolubilizing the native polysaccharide produced by *Xanthomonas campestris* NRRL B–1459 from its fermentation medium in the form of a quaternary amine complex, isolating the precipitated complex, dissociating the complex under conditions that render the free polysaccharide insoluble, and recovering the quaternary amine in a form suitable for recycling, and separately recovering and drying the water-soluble polysaccharide.

Another object is the provision of a process employing certain quaternary amines as precipitants for the bacterial polysaccharides in which substantially the entire amount of quaternary amine employed is recovered for reuse.

The above and other objects will become clearer in the course of the following disclosure and examples.

In accordance with the objects of our invention we have now discovered that microbial polysaccharides and particularly that produced by a whole culture fermentation of the bacterium *Xanthomonas campestris* NRRL B–1459 in a fermentation medium originally comprising about 2.5 percent of available carbohydrate sources as well as available nitrogen and trace elements may be quantitatively isolated from the fermentation medium by a process in which the fully fermented culture (4–5 days) containing about 1.5 percent by weight of dissolved microbial polysaccharide and having a viscosity at room temperature of about 7,000 cps. is first diluted with at least 2 parts by volume of water or recycled precipitation liquids which contains a small amount of quaternary amine. Optionally, to obtain a purer product, the diluted fermentation solution may be supercentrifuged to remove a small amount of microbial cells and fermentation debris. When the dilution is less than five-fold a critical proportion (0.35–1.0 percent based on the diluted solution) of an alkali metal chloride (NaCl, KCl) is also required for forming and precipitating the resulting polysaccharide-quaternary amine complex, i.e., when the fermentation broth has been diluted by a factor below 5 and the salt is omitted the polysaccharide-quaternary amine complex is a voluminous gel that does not precipitate. Following the addition (or make-up) of at least about 0.8 part of quaternary amine based on the dry weight of microbial polysaccharide, a fibrous precipitate of the polysaccharide-quaternary amine complex slowly forms. The readily centrifuged precipitate is isolated and the complex dissociated by washing in several changes of methanol containing 0.05–0.20 percent of a said alkali metal salt which salt is necessary to prevent partial loss of the freed native polysaccharide by partial solubilization as well as to prevent subsequent filtration difficulties due to gelatinization. The pooled washes are concentrated to recover both the quaternary compound and the alcohol for recycling.

We have explicitly found that there is an inverse relationship between the alkali metal salt requirement and the imposed dilution so that when the fermented broth is diluted with about 5 or more volumes of water or recycled precipitation liquids, and the required amount of the quaternary amine is also present, the presence of an alkali metal salt is not required for forming or insolubilizing and precipitating the polysaccharide-quaternary complex. However, the cost of processing the additional diluent may offset the cost of the salt.

The following examples are presented to illustrate the operation of our process. It will be apparent that an indefinite succession of fermentation batches can be treated with minimal make-up of reagents.

Example 1

A 4-day pilot plant fermentation of *Xanthomonas campestris* NRRL B–1459 containing about 1.5 percent (dry basis) of microbial polysaccharide and having a viscosity of 7,000 cps. was diluted with 2 parts of water and supercentrifuged to remove the small amount of microbial cells.

To 150 lbs. of the above centrifugate one pound of potassium chloride was added to give a concentration of 0.67 percent potassium chloride. Then we added 560 gms. of a 50 percent solution of cetyltrimethylammonium chloride in isopropanol, representing about 0.8 part by weight of actual quaternary amine per part of dry polysaccharide. A stringy precipitate formed during the succeeding 10 minutes of stirring. Centrifugation yielded 4 pounds of wet cake which was then broken up and agitated for about 20 minutes in successive changes of methanol containing 0.1 percent potassium chloride to dissociate the complex and liberate the quaternary compound from the polysaccharide without resolubilizing the latter. After 6 washings the methanol washes were pooled and evaporated to a concentrate which contained 98 percent of the total quaternary amine. The concentrate was recycled for precipitating the next batch of polysaccharide from its fermentation broth.

The methanol-washed cake was dried under 25 in. Hg vacuum at 105° F. to yield 350 grams of B-1459 polysaccharide.

*Example 2*

Fifty pounds of whole fermentation broth, as described in Example 1, was diluted with 250 pounds of water. No alkali metal salt was added. Addition of 560 grams of a 50 percent solution of cetyltrimethylammonium chloride in isopropanol (representing about 0.8 part by weight of actual quaternary amine per part of dry polymer) produced a stringy precipitate during the course of 10 minutes of stirring. Centrifugation yielded 4 pounds of wet cake which was broken up and agitated for about 20 minutes in successive changes of methanol containing 0.2 percent potassium chloride. After 6 washings the methanol washes were pooled and evaporated to recover 98 percent of the quaternary amine in the concentrate, which was reused to precipitate additional polysaccharide.

The methanol-washed cake was dried under 25 in. Hg vacuum at 105° F. to yield 350 grams of B-1459 polysaccharide.

Essentially all of the remaining 2 percent of the quaternary amine was made available for use by recycling the centrifugate from the quaternary amine-polysaccharide precipitation for primary dilution of the next batch of polysaccharide-containing broth.

*Example 3*

One hundred grams of the fermentation broth described in Example 2 was diluted with 500 grams of water. No salt was added. After addition of 5.16 grams of dodecyltrimethylammonium chloride (172 percent of actual quaternary amine based on the weight of dry polysaccharide) the resulting precipitate was screened off, dehydrated with methanol containing 0.2 percent KCl and dried to give 1.21 grams of polysaccharide B-1459.

*Example 4*

One hundred grams of the fermentation broth described in Example 2 was diluted with 500 grams of water. No salt was added. After addition of 2.75 grams of a 50 percent solution of a mixture of methyldodecylbenzyl trimethylammonium chloride and methyldodecylxylene bis(trimethylammonium chloride) (90 percent by weight of actual quaternary amines based on dry polymer) the resulting precipitate was screened off, dehydrated with methanol containing 0.2 percent KCl and dried to give 1.50 grams of polysaccharide B-1459.

*Example 5*

One hundred grams of fermentation broth as previously described was diluted with 200 grams of water and 2 grams of KCl added. After addition of 1.94 grams of a 50 percent solution of cetyltrimethylammonium chloride in isopropanol (representing 64.7 percent quaternary amine based on the dry polysaccharide) the resulting precipitate was screened off, dehydrated with methanol containing 0.1 percent KCl, and dried to give 1.0 gram of polysaccharide B-1459.

Quaternary amines that can be employed are a 50 percent solution of cetyltrimethylammonium chloride in isopropanol; a 50 percent solution of a mixture of methyldodecyclbenzyl trimethylammonium chloride and methyldodecylxylene bis(trimethyl ammonium chloride); and dodecyltrimethylammonium chloride. Benzyl trimethyl ammonium chloride was found to be inoperative.

We claim:

1. A method of recovering the microbial polysaccharide produced in a whole culture aerobic fermentation of *Xanthomonas campestris* NRRL B-1459 wherein said polysaccharide is present in the fermentation broth at a concentration of about 1.5 percent on a dry weight basis comprising the steps of diluting the said broth with about 2 to about 5 parts of aqueous diluent per part of said broth, adding 0.35–1.0 percent by weight of an alkali metal halide when the proportion of added diluent to said broth is below the value of 5, adding about 0.8 part by weight based on dry polymer of a quaternary amine selected from the group consisting of cetyltrimethylammonium chloride, methyldodecylbenzyltrimethylammonium chloride, dodecyltrimethyl ammonium chloride, methyldodecylxylene bis(trimethyl ammonium chloride), and mixtures thereof, stirring for about 10 minutes to form a precipitated quaternary amine-polysaccharide complex, separating off the liquid phase for diluent use in the next batch, dissociating the said complex by washing in changes of methanol containing 0.05–0.2 percent of an alkali metal halide, removing the wash alcohol, drying the polysaccharide under vacuum, and concentrating the pooled methanol washes for recycle.

2. The method of claim 1 wherein the fermentation broth is diluted with 2 parts of aqueous diluent and the quaternary amine is cetyltrimethylammonium chloride.

3. The method of claim 1 wherein the fermentation broth is diluted with 5 parts of aqueous diluent and the quaternary amine is cetyltrimethylammonium chloride.

4. The method of claim 1 wherein the fermentation broth is diluted with 5 parts of aqueous diluent and the quaternary amine is a mixture of methyldodecylbenzyl trimethylammonium chloride and methyldodecylxylene bis(trimethylammonium chloride).

References Cited in the file of this patent

UNITED STATES PATENTS 3,000,790    Jeanes et al. _____ Sept. 19, 1961